United States Patent Office 3,533,550
Patented Oct. 13, 1970

3,533,550
LAMINATE AND A PACKAGE OBTAINED FROM THIS LAMINATE
Boye Benzon-Petersen, Lund, Sweden, assignor to AB Akerlund & Rausing, Lund, Sweden, and Arenco Aktiebolag, Vallingby, Sweden, both corporations of Sweden
Filed Mar. 17, 1969, Ser. No. 807,533
Claims priority, application Sweden, Mar. 19, 1968, 3,596/68
Int. Cl. B65d 85/10
U.S. Cl. 229—51
9 Claims

ABSTRACT OF THE DISCLOSURE

A package particularly suitable for cigarettes and the like made from a laminated material in which cut-throughs are made in most but not all of the plys to facilitate opening of the package across a corner for removing the cigarettes.

---

The present invention relates to a laminate intended for production of packages and comprising an outer layer of a plastic material, for example polyethylene, and a basic layer, which preferably also is made as a laminate. The invention also relates to a package produced from this laminate.

The laminate is characterized in that the basic layer has been cut through before the applying of the outer layer providing opening indications in the finally made packages.

The invention is preferably intended to be used in connection with production of cigarette packages and the basic layer shall therefore be composed of a paper, which together with a plastic material, for example polyethylene, has been laminated to an aluminium foil, said basic layer being cut through after that one of its sides has been laminated to a plastic material, but before the other side has been laminated to a plastic material.

Conventional cigarette packages are normally composed of a number of various separate materials. The purpose of the present invention is to make a laminate, which alone may be used for production of cigarette packages. This laminate shall show an extremely high tightness. If one chooses a well-known laminate, having this tightness, one meets at once difficulties in obtaining a suitable opening device, which at the same time is tight enough.

A package produced of the above mentioned laminate is, however, tight as well as easy to open. The package according to the invention will be especially easy to open, if the blank of this package is so punched out or cut out of the laminate, that said cut through at least at one point or preferably at two points will reach the outer limiting edge of the blank.

The invention will be described in greater detail in the following with reference to the accompanying drawings showing as an example some preferred embodiments of the subject matters of the invention.

Figure 1:
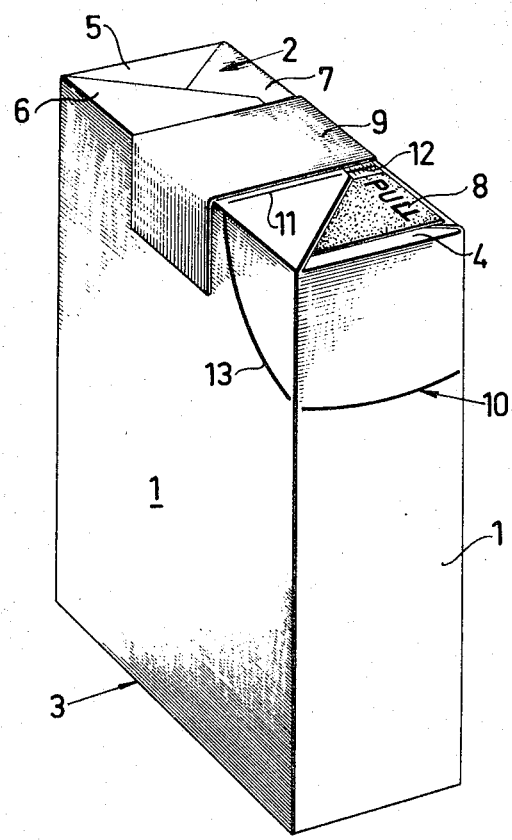
Figure 2:
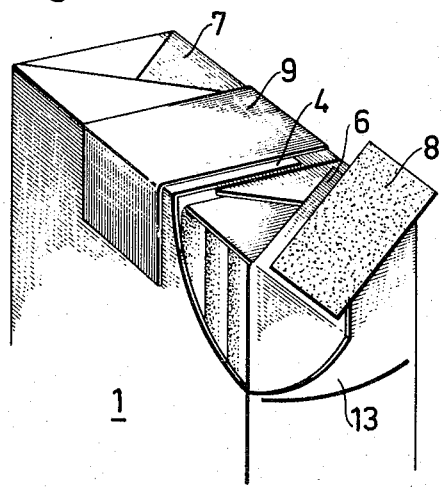
Figure 3:
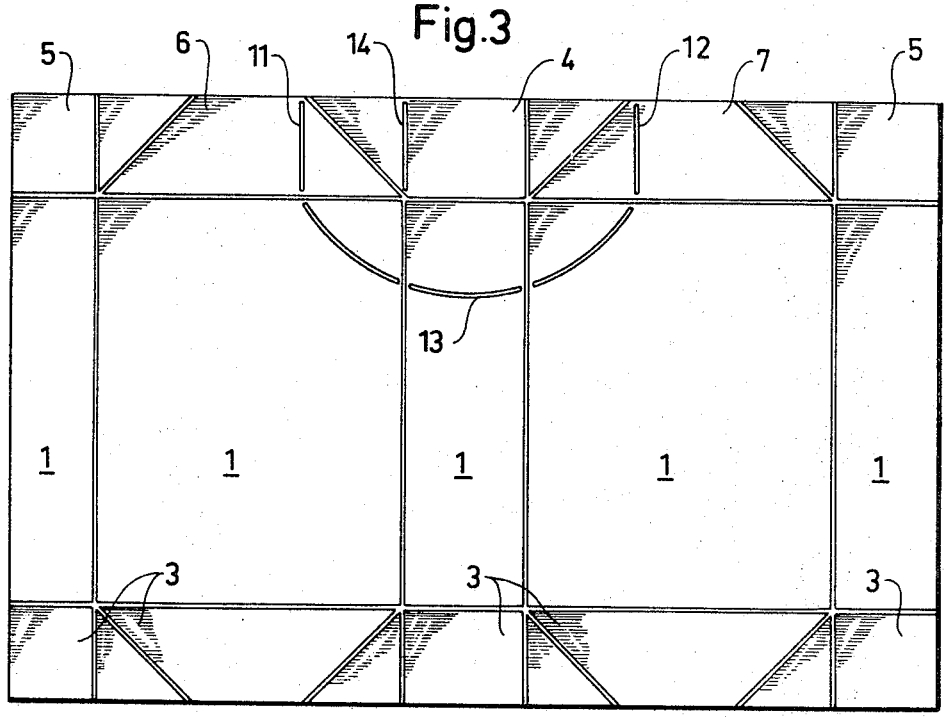
Figure 4:
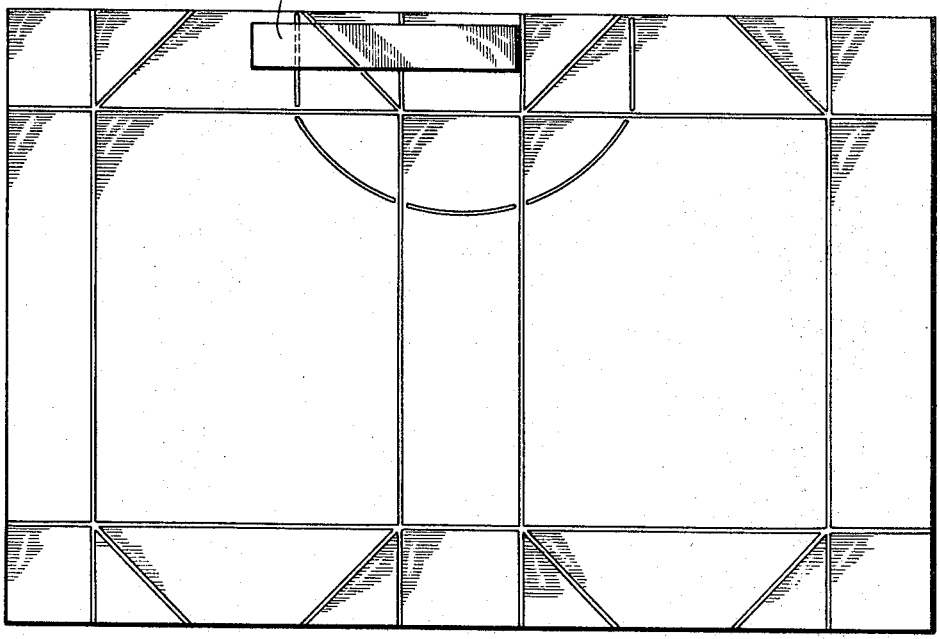
Figure 5:
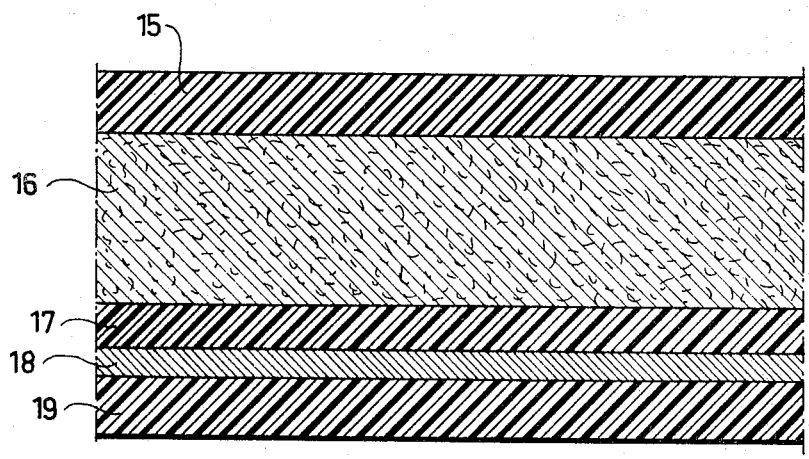
Figure 6:
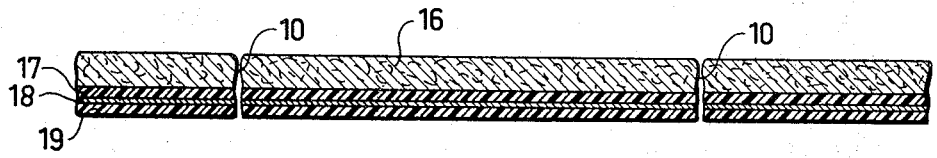
Figure 7:
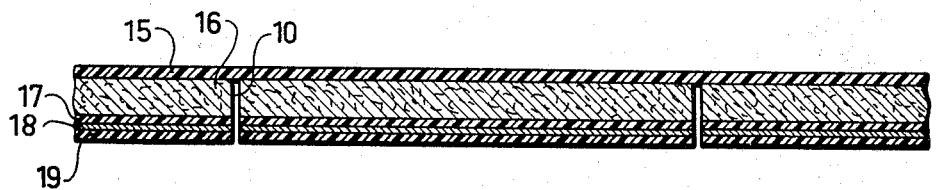
Figure 8:
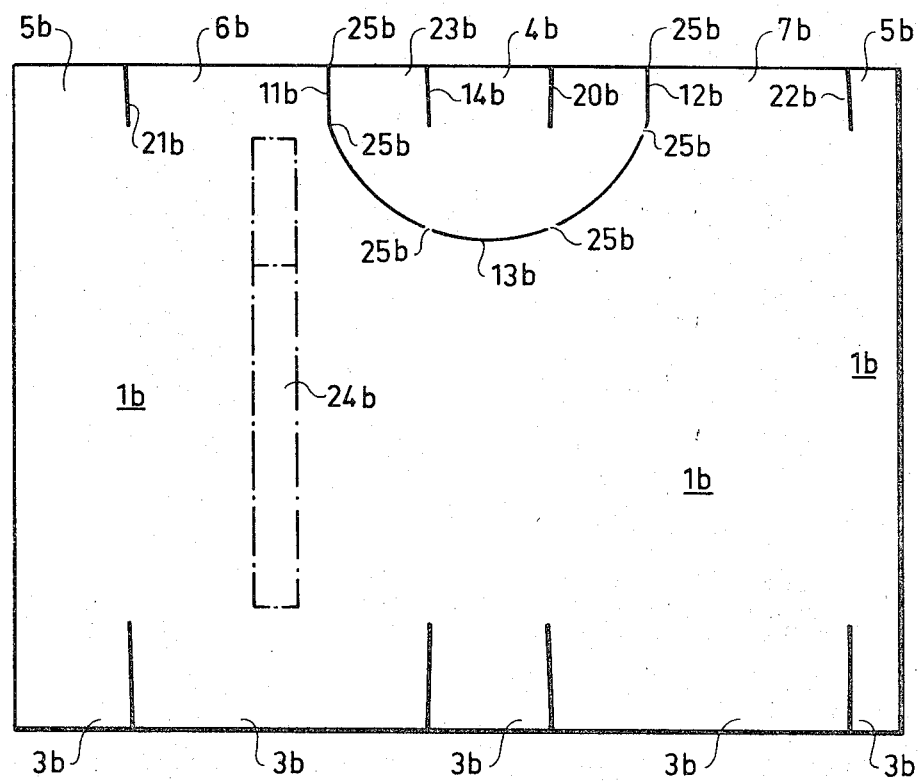

FIG. 1 shows a first embodiment of the package according to the invention.
FIG. 2 shows the same package partly opened.
FIG. 3 shows the blank for the same package in flat condition.
FIG. 4 shows a modified blank.
FIG. 5 shows a scaled up section through the laminate according to the invention.
FIG. 6 shows a basic layer in the laminate according to the invention before this basic layer has been covered with plastic.
FIG. 7, finally, shows the same basic layer after the plastic covering of this layer, i.e. the ready laminate according to the invention.
FIG. 8, finally shows one more modified blank.

The ready package shown in FIG. 1 has a parallelepipedic configuration and consists of four in pairs parallel side walls 1, a top closure 2 and a bottom closure 3. The top closure is made in such a way that firstly two opposite top fields 4 and 5 have been folded inwards over the top side of the package. Hereby also a certain folding is done of parts of the both intermediate top fields 6 and 7. The remaining parts of these top fields 6 and 7 have thereafter been folded inwards one after the other. Before the top field 6 has been folded an extra draw lap 8 has been attached to the inside of the top field. This draw lap may be formed as an essential rectangular carton sheet. Outermost the package shows a plastic layer, and therefore it is suitable if the various top fields can be sealed against each other by heat sealing. Finally a taxation receipt 9 or the like has been attached over the package. The shown package is also provided with an opening arrangement, which exclusive the carton sheet 8 includes a cut-through 10 extending around the upper corners of the package. This cut-through 10 includes two cuts 11 and 12, which extend across the two top fields, which are folded latest, one arched cut 13, which extends around the corners of the package between the innermost points of these cuts, and a fourth cut 14, which extends along one of the limit edges of the top field 4 and which therefore is concealed in FIG. 1 (see FIG. 3). As seen in FIG. 1, the two cuts 11 and 12 are superimposed, i.e. are in alignment when the top fields in which they are included are folded inward, and they extend inwardly from the edges of the top fields to the fold lines joining these top fields to the adjacent side walls or fields 1.

The construction according to FIG. 4 is quite in accordance with the construction according to FIGS. 1–3, except of the fact that the construction omits the slit 14, and is furnished with a drawing strip 8a of a plastic material instead of the carton lap 8 shown in FIGS. 1 and 2. Any detailed description of this figure is therefore not needed.

FIG. 5 shows the material used for the package according to the invention. This material consists of, seen from outside to inside, a layer of polyethylene 15, applied by a bright roller, a paper layer 16, a layer of polyethylene 17, an aluminium foil 18 and an inner layer of polyethylene 19, applied by a tarnished roller. This laminate is preferably made by firstly laminating the paper layer 16 ot the aluminium foil 18 together by use of polyethylene layer 17. Thereafter this laminate is coated by a polyethylene layer 19 applied to foil 18. Thereafter the cuts 11, 12, 13 and 14 are made as shown in FIG. 6. Finally the plastic layer 15 is applied by extruding, whereafter the laminate is ready for use. From this laminate the blanks, shown in FIGS. 3 and 4, are punched or cut out. This can be done either before the actual packaging operation or in connection with this.

In FIG. 8 finally one more modified blank is shown. Due to the fact that this blank essentially is made in accordance with the same principles as the blanks according to FIGS. 3 and 4 the same reference numerals have been used as in said figures, but with the addition of b. The sidewalls have been numbered 1b and the bottom closure 3b. In the same way the cuts of the opening device have been numbered 11b, 12b, 13b and 14b. By this construction, however, a fifth cut 20b has been added. The top fields have been numbered 4b, 5b 6b and 7b. Furthermore two cuts 21b and 22b have been added. Together with the cuts 14 and 20b those cuts divide the different top fields 4b–7b from each other. A triangular corner flap 23b is a part of the top field 6b last folded down. This corner flap 23b is not attached to the underlying material and may therefore be used as a pull flap in the same way as the drawing strip 8a by the construction according to FIG. 4. Finally, a drafted cigarette is numbered 24b and a number of small unbroken portions numbered 25b, between longer arcuate cuts 13b hold the otherwise punched out opening part of the blank.

The invention is not, of course, restricted to the embodiments described above, but may be varied within the scope of the following claims. Thus the range of application is of course not restricted to cigarette packages only. Another possible range of application is for example crispbread packages. Further the form and position of the cut-through 10 may be varied within wide limits. In some cases perhaps one will open only the top side of the package. Hereby the cut 13 is made as a straight line along the upper limit edge of the sidewall fields 1. Furthermore the material composition may be adapted within wide limits to the demands, which may be made on the chemical and mechanical characteristics of the package, for example aroma tightness, rigidity and elasticity or of the tearability of the opening device. Furthermore admixtures to the polyethylene coating of the surface layer may counteract stickiness in coin operated dispensing machines for tobacco packages and may provide better friction conditions in the packaging machines.

What is claimed is:

1. A parallelepipedic package for cigarettes and the like made from a laminated blank including an outer layer of plastic material such as polyethylene laminated to a base layer which in itself is preferably a laminate, said blank when erected providing two pairs of oppositely disposed parallel side walls, a bottom closure and a top closure, said top closure being constituted by two pairs of oppositely disposed top fields, a first pair of said top fields being folded inwardly followed by folding of the second pair of top fields over the infolded fields of the first pair, said blank being provided with a cut-through extending through said base layer prior to its lamination with said outer layer to facilitate opening of the package, said cut-through including first and second parallel cuts which extend across said top fields of said second pair inwardly from the outer edges thereof to their fold lines with the adjacent side walls, and a third arcuate cut extending from the inner end of said first cut around a corner of the package to the inner end of said second cut.

2. A parallelepipedic package as defined in claim 1 and which further includes a fourth cut parallel with said first and second cuts and extending along one limit edge of a top field of the first pair where it adjoins a limit edge of a top field of the second pair, said fourth cut being located between said first and second cuts and extending inwardly from the outer edge of the top field to the fold line with the adjacent side wall.

3. A parallelepipedic package as defined in claim 1 and which further includes fourth and fifth cuts parallel with said first and second cuts and extending respectively along the opposite limit edges of a top field of the first pair where they adjoin limit edges of top fields of the second pair, said fourth and fifth cuts being located between said first and second cuts and extending inwardly from the outer edge of the top field to the fold line with the adjacent side wall thereby dividing said top field from the other top fields.

4. A parallelepipedic package as defined in claim 3 and which further includes additional cuts parallel to said fourth and fifth cuts and which serve to separate the remainder of the top fields each from the other.

5. A parallelepipedic package as defined in claim 4 wherein one corner flap of a top field last to be folded inwardly remains unattached to the underlying material thereby enabling said corner flap to be used as a pull flap for opening the package.

6. A parallelepipedic package for cigarettes and the like made from a laminated blank including an outer layer of plastic material such as polyethylene laminated to an intnermediate base layer which in itself is a laminate including a paper layer, a foil layer joined at one side to one side of said paper layer by a plastic layer, and an inner plastic layer joined to the other side of said foil layer, said blank when erected providing two pairs of oppositely disposed parallel side walls, a bottom closure and a top closure, said top closure being constituted by two pairs of oppositely disposed top fields, a first pair of said top fields being folded inwardly together with portions of the top fields of the second pair followed by folding of the remaining portions of the top fields of the second pair after the other, said blank being provided with a series of closely spaced elongated cuts establishing a cut-through extending through said inner plastic layer and through said laminated base layer to said outer plastic layer prior to lamination of said base layer with said outer plastic layer, said cut-through being closed upon itself upon formation of the package and extending across said top fields and around a corner of the package.

7. A parallelepipedic package for cigarettes and the like as defined in claim 6 and which further includes a draw strip interposed between said folded remaining portions of the top fields of said second pair.

8. A parallelepipedic package for cigarettes and the like as defined in claim 7 and wherein said draw strip is located on the blank prior to formation of the package.

9. A parallelepipedic package for cigarettes and the like as defined in claim 6 wherein said cut-through includes first and second straight cuts extending across the folded remaining portions of the top fields of said second pair, a third arcuate cut extending around a corner of the package between the innermost points of said first and second cuts and a fourth straight cut which extends along one of the limit edges of one of the top fields of said first pair.

References Cited

UNITED STATES PATENTS

| 3,115,293 | 12/1963 | Hovland. |
|---|---|---|
| 3,237,843 | 3/1966 | Reed et al. |
| 3,265,287 | 8/1966 | Hovland. |

DAVID M. BOCKENEK, Primary Examiner

U.S. Cl. X.R.

161—216; 206—41.2; 229—3.5, 87

PO-1050
(5/69)

UNITED STATES PATENT OFFICE
CERTIFICATE OF CORRECTION

Patent No. 3,533,550    Dated   October 13, 1970

Inventor(s)   Boye Benzon-Petersen

It is certified that error appears in the above-identified patent and that said Letters Patent are hereby corrected as shown below:

Claim 6, line 15 - insert the word "one" before "pair"

SIGNED AND
SEALED
DEC 1 - 1970

(SEAL)
Attest:

Edward M. Fletcher, Jr.
Attesting Officer

WILLIAM E. SCHUYLER, JR.
Commissioner of Patents